(12) United States Patent
Faith et al.

(10) Patent No.: US 12,299,563 B2
(45) Date of Patent: May 13, 2025

(54) SYSTEMS AND METHODS FOR GENERATING HASH TREES AND USING NEURAL NETWORKS TO PROCESS THE SAME

(71) Applicant: Deep Labs Inc., San Francisco, CA (US)

(72) Inventors: Patrick Faith, Pleasanton, CA (US); Scott Edington, Arlington, VA (US)

( * ) Notice: Subject to any disclaimer, the term of this patent is extended or adjusted under 35 U.S.C. 154(b) by 0 days.

(21) Appl. No.: 16/951,849

(22) Filed: Nov. 18, 2020

(65) Prior Publication Data

US 2021/0073652 A1 Mar. 11, 2021

Related U.S. Application Data

(63) Continuation of application No. PCT/US2019/033184, filed on May 20, 2019.
(Continued)

(51) Int. Cl.
*G06N 3/08* (2023.01)
*G06F 18/2415* (2023.01)
(Continued)

(52) U.S. Cl.
CPC ......... *G06N 3/08* (2013.01); *G06F 18/24155* (2023.01); *G06N 3/045* (2023.01); *G06N 5/01* (2023.01); *G06N 7/01* (2023.01)

(58) Field of Classification Search
CPC .... G06F 17/148; G06N 7/005; G06N 3/0454; G06N 3/08; G06N 3/02; G06N 5/003; G06K 9/6278
See application file for complete search history.

(56) References Cited

U.S. PATENT DOCUMENTS 6,701,362 B1 3/2004 Subramonian
6,959,384 B1 10/2005 Serret-Avila
(Continued)

FOREIGN PATENT DOCUMENTS

WO WO-0197528 A2 * 12/2001 ............. H04N 19/61
WO WO-2019213426 A1 * 11/2019 ............. G06N 20/00

OTHER PUBLICATIONS

Wang et al. "Predicting time series with wavelet packet neural networks." IJCNN'01. International Joint Conference on Neural Networks. Proceedings (Year: 2001).*
(Continued)

*Primary Examiner* — Michael J Huntley
*Assistant Examiner* — Adam C Standke

(57) ABSTRACT

The present disclosure relates to systems and methods for generating a persona and detecting anomalies using a hash tree. In one implementation, the system may include one or more memories storing instructions and one or more processors configured to execute the instructions. The instructions may include instructions to receive a plurality of data structures related to an individual, convert the data structures into a plurality of Bayesian wavelets, group the Bayesian wavelets into a tree structure, using transitions between the Bayesian wavelets within the tree structure, generate a plurality of Markovian wavelets representing the transitions, replace one or more of the Bayesian wavelets with hashes, and output the tree structure as a persona representing the individual. The instructions may also include training a neural network.

7 Claims, 14 Drawing Sheets

Related U.S. Application Data

(60) Provisional application No. 62/673,547, filed on May 18, 2018.

(51) Int. Cl.
  G06N 3/045 (2023.01)
  G06N 5/01 (2023.01)
  G06N 7/01 (2023.01)

(56) References Cited

U.S. PATENT DOCUMENTS 9,613,439 B1 * 4/2017 Raj .................. G06T 11/005
2018/0054452 A1   2/2018 Muddu

OTHER PUBLICATIONS

Mishra et al. "Image encryption technique incorporating wavelet transform and hash integrity." IJRET: International Journal of Research in Engineering and Technology 4.02 (Year: 2015).*
A) Xu, Lijun, and Yong Yan. "Wavelet-based removal of sinusoidal interference from a signal." Measurement Science and Technology 15.9 (Year: 2004).*
B) Maofa, Gong, et al. "Harmonic analysis approach based on wavelet transform and neural network." 2011 4th International Conference on Electric Utility Deregulation and Restructuring and Power Technologies (DRPT). IEEE (Year: 2011).*
Romberg et al. "Bayesian tree-structured image modeling using wavelet-domain hidden Markov models." IEEE Transactions on image processing (Year: 2001).*
Wang et al. "Predicting time series with wavelet packet neural networks."IJCNN'01. International Joint Conference on Neural Networks. Proceedings (Year: 2001).*
Abdallah et al. "Video watermarking using wavelet transform and tensor algebra."Signal, Image and Video Processing 4.2 (Year: 2010).*
Sattar et al. "The use of a filter bank and the Wigner-Ville distribution for time-frequency representation." IEEE transactions on Signal Processing 47.6 (Year: 1999).*
Mishra et al. "Image encryption technique incorporating wavelet transform and hash integrity." IJERT: International Journal of Research in Engineering and Technology 4.02 (Year: 2015).*
Gaing, Zwe-Lee. "Wavelet-based neural network for power disturbance recognition and classification." IEEE transactions on power delivery 19.4 (Year: 2004).*
Xu, Lijun, and Yong Yan. "Wavelet-based removal of sinusoidal interference from a signal." Measurement Science and Technology 15.9 (Year: 2004).*
Maofa, Gong et al. "Harmonic analysis approach based on wavelet transform and neural network." 2011 4th International Conference on Electric Utility Deregulation and Restructuring and Power Technologies(DRPT) (Year: 2011).*
Hash function from Wolfram Math World. (n.d.). Retrieved Jun. 22, 2022, from https://mathworld.wolfram.com/HashFunction.html (Year: 2022).*
Lira, Milde MS, et al. "Combining multiple artificial neural networks using random committee to decide upon electrical disturbance classification." 2007 International Joint Conference on Neural Networks. IEEE (Year: 2007).*
Kanarachos, et al. "Detecting anomalies in time series data via a deep learning algorithm combining wavelets, neural networks and Hilbert transform." Expert Systems with Applications 85 (2017) (Year: 2017).*
Ko, K et al. "Bayesian Wavelet Analysis of Autoregressive Fractionally Integrated Moving-Average Processes"; Journal of Statistical Planning and Inference 136 (2006); Publication [online]. Mar. 22, 2005.
He, L et al. "Exploiting Structure in Wavelet-Based Bayesian Compressive Sensing"; Department of Electrical and Computer Engineering Duke University; Publication [online]. Apr. 7, 2009.
Examination Report issued for counterpart Australian Application No. 2019269746 dated Sep. 20, 2023 (3 pages).

* cited by examiner

SYSTEMS AND METHODS FOR GENERATING HASH TREES AND USING NEURAL NETWORKS TO PROCESS THE SAME

CROSS REFERENCES TO RELATED APPLICATIONS

This application is a continuation of International Application No. PCT/US2019/033184, filed May 20, 2019, which claims priority to U.S. Provisional Patent Application No. 62/673,547, filed May 18, 2018, both of which are incorporated herein by reference in their entirety.

TECHNICAL FIELD

The present disclosure relates generally to the field of neural networks. More specifically, and without limitation, this disclosure relates to systems and methods for using neural networks to process hash trees.

BACKGROUND

Extant methods of risk detection generally are point-based. Accordingly, each new event (such as a transaction, a trip, a communication, or the like) is modeled as a point and assessed with respect to a history of points associated with the same person. However, such techniques suffer from relatively larger error rates and poor personalization. For example, fraud remains high even when reduced using such extant techniques. Moreover, irrelevant or uninteresting communications are still generated when such techniques are used to personalize offers or other communications.

More advanced models using neural networks have been developed but suffer from low backwards-compatibility. For example, models developed using TensorFlow cannot be applied to existing databases of events without vast increases in processing power and memory capacity. Moreover, data intake for such systems is often too slow to provide on-demand decisions, e.g., for transactions, for authorization, or the like.

SUMMARY

In view of the foregoing, embodiments of the present disclosure provide systems and methods for generating hash trees and processing the same using neural networks. The hash trees disclosed herein may provide greater accuracy and better personalization than existing point-based techniques.

Further, by employing the hash trees described herein, existing databases of events (such as transactions, itineraries, reservations, video recordings, audio recordings, emails, or the like) may be used without significant increase in memory and processing capacities because embodiments of the present disclosure may be more efficient than extant neural networks. Moreover, hash trees as described herein may provide on-demand decisions on appropriate timescales (e.g., seconds for transactions, minutes for authorization, or the like).

According to an example embodiment of the present disclosure, a system for generating a persona using a hash tree may comprise one or more memories storing instructions and one or more processors configured to execute the instructions. The instructions may include instructions to receive a plurality of data structures related to an individual, convert the data structures into a plurality of Bayesian wavelets, group the Bayesian wavelets into a tree structure, using transitions between the Bayesian wavelets within the tree structure, generate a plurality of Markovian wavelets representing the transitions, replace one or more of the Bayesian wavelets with hashes, and output the tree structure as a persona representing the individual.

In another embodiment, a system for training a deep field network to detect anomalies within a hash tree may comprise one or more memories storing instructions and one or more processors configured to execute the instructions. The instructions may include instructions to receive a plurality of tree structures representing individuals, each tree structure including Bayesian wavelets and Markovian wavelets governing transitions between the Bayesian wavelets, group the Bayesian wavelets in the tree structures by coefficients, train a neural network for each group independently of other groups, and integrate the neural networks into a deep field network.

In another embodiment, a system for detecting anomalies within a hash tree comprises one or more memories storing instructions and one or more processors configured to execute the instructions. The instructions may include instructions to receive a new data structure related to an individual, convert the data structure into a Bayesian wavelet, using a tree structure of existing Bayesian wavelets associated with the individual, calculate one or more harmonics, determine a measure of whether the Bayesian wavelet alters the one or more harmonics, and add the Bayesian wavelet to the tree structure when the measure is below a threshold.

Any of the alternate embodiments for disclosed systems may apply to disclosed non-transitory computer-readable media storing instructions for methods disclosed herein.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Figure 1:
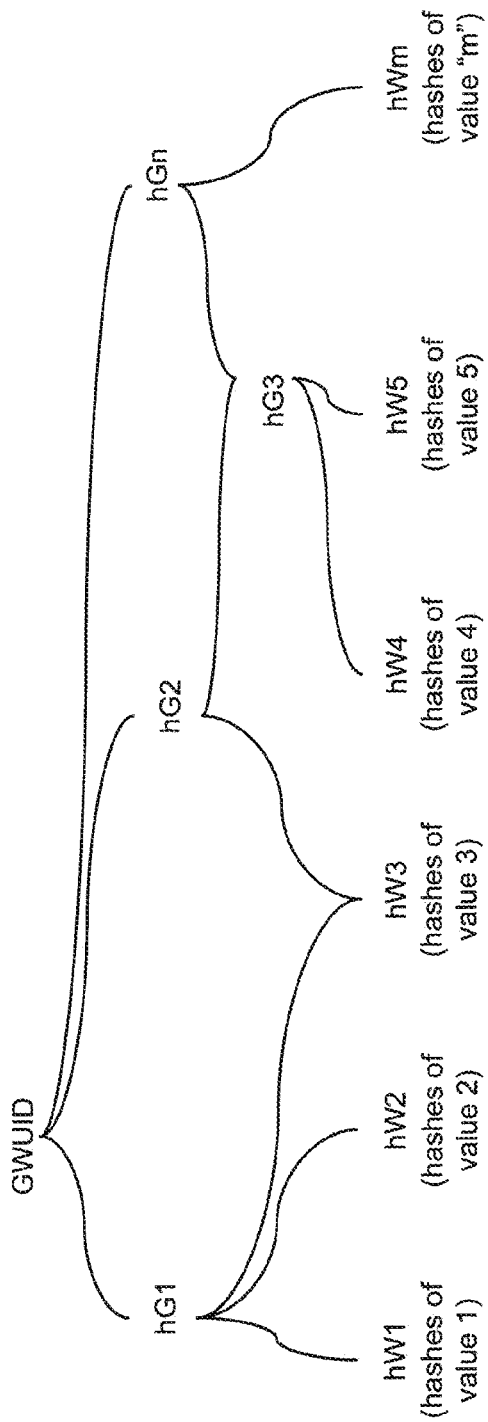
FIG. 1 is a diagram of a wavelet tree structure, according to an exemplary embodiment of the present disclosure.

The disclosed embodiments relate to systems and methods for generating a persona using a hash tree, training a deep field network to detect anomalies within a hash tree, and detecting anomalies within a hash tree. Embodiments of the present disclosure may be implemented using a general-purpose computer. Alternatively, a special-purpose computer may be built according to embodiments of the present disclosure using suitable logic elements.

As used herein, "deep field network" refers to one or more trained algorithms integrated into a prediction schema. In some embodiments, deep field networks may be applied to a multi-nodal manifold converted differential field, e.g., determined based on the difference between a wavelet converted to a tensor and a field of existing (e.g., previous) tensors.

Disclosed embodiments allow for efficient and accurate detection of anomalies within a tree structure as well as determination of harmonics within the tree structure. Additionally, embodiments of the present disclosure allow for efficient and accurate authorization of new events (e.g., transactions, authorizations, or the like) or personalization of communications based on the tree structure. Furthermore, embodiments of the present disclosure provide for greater flexibility and accuracy than extant anomaly detection techniques, such as rule-based determinations, decision trees, and neural networks.

As used herein, a "tree structure" may refer to any chainified representation of data objects. For example, the tree structure may comprise a hash structure (e.g., a Merkel tree or the like), a blockchain (e.g., a chain of verified blocks representing transactions, or other events), or any other similar structure organized in a tree (e.g., as depicted in FIGS. 1-4, described below).

According to an aspect of the present disclosure, a processor may receive a plurality of data structures related to an individual. For example, the data structures may be received from one or more memories (e.g., a volatile memory such as a random access memory (RAM) and/or a non-volatile memory such as a hard disk) and/or across one or more computer networks (e.g., the Internet, a local area network (LAN), or the like). The data structures may represent transactions having associated properties (such as time, location, merchant, amount, etc.), reservations having associated information (such as a name, an identification number, a time, a merchant, etc.), emails sent to a person, or any other discrete event represented in a bundle of data.

In some embodiments, the processor may convert the data structures into a plurality of Bayesian wavelets. As used herein, the term "wavelet" refers to any data that may be represented as a brief oscillation. For example, an oscillation with an amplitude rising from zero to a maximum and returning to zero over a finite period of time comprises an example of a wavelet. A transaction may be visualized as a wavelet in which currency and/or commodity is temporarily disturbed by transfer between parties. The wavelet representing the transaction may be indexed by location, time, category of transaction (e.g., furniture, contractor services, grocery, or the like), and/or other indicators. Similarly, a reservation may be visualized as a wavelet in which currency and/or capacity (e.g., of rooms, of vehicles, or the like) is temporarily disturbed. The wavelet representing the reservation may be indexed by location, time, amount (e.g., number of vehicles and/or days, number of rooms and/or days, or the like), and/or other indicators.

The wavelet need not be received in the form of an oscillation but may be represented in any appropriate form (e.g., an array, a digital signal, or the like). A wavelet is "Bayesian" if the wavelet depends on a history of an event represented by the wavelet. For example, the processor may update the wavelet over time depending on an evolving history of the event. For example, a wavelet associated with a reservation may change state over time when booked, when checked in, and when complete. As another example, a wavelet associated with a transaction may change state over time when initiated, when authorized, and when paid.

In some embodiments, the processor may group the Bayesian wavelets into a tree structure. For example, the Bayesian wavelets may be organized along at least one dimension in time such that Bayesian transformations of the wavelets occur along the at least one dimension. Additionally or alternatively, the Bayesian wavelets may be grouped with respect to channel. For example, the source of the data structures (and, thus, of the corresponding Bayesian wavelets) may comprise the channel. Accordingly, Bayesian wavelets representing emails may be grouped separately from Bayesian wavelets representing phone call logs. In another example, Bayesian wavelets representing brick-and-mortar transactions may be grouped separately from Bayesian wavelets representing online transactions.

Each wavelet may include one or more coefficients (e.g., in a Fourier series representing the oscillation). Accordingly, the processor may group the wavelets into a tree structure by these coefficients. Additionally or alternatively, in embodiments using tensors as described below, each tensor includes coefficients for each base in the set of bases representing a corresponding multi-dimensional space in which the tensor may be represented. Accordingly, the processor may group the tensors (and therefore, the corresponding wavelets) into a tree structure by these coefficients. Because the coefficients depend on the bases selected (which must satisfy one or more mathematical rules in order to form a mathematically consistent multi-dimensional space), the processor may generate a plurality of groups of coefficients and, thus, a plurality of groupings of the tensors (with the corresponding wavelets). Accordingly, a plurality of tree structures may be formed depending on which bases are selected. For example, the processor may select bases depending on which factors are most heavily weighted in one or more predictive models and then perform a plurality of groupings into tree structure, each for a particular model (or set of models) having factors corresponding to the bases used to determine the corresponding tree structure.

In some embodiments, using transitions between the Bayesian wavelets within the tree structure, the processor may generate a plurality of Markovian wavelets representing the transitions. As used herein, a "Markovian wavelet" may refer to any data structure representing a transition matrix between wavelets (e.g., Bayesian wavelets). A Markovian wavelet may represent a transition between one state to another state for a Bayesian wavelet of the same object (e.g., a transaction, a reservation, or the like) or between one Bayesian wavelet and a different Bayesian wavelet (e.g., from an email to a transaction, from a phone call to a reservation, or the like).

In some embodiments, the processor may replace one or more of the Bayesian wavelets with hashes. For example, as depicted in FIG. 1, a portion of the tree structure may comprise a hash tree for one or more of the Bayesian wavelets. Additionally or alternatively, the processor may hash each Bayesian wavelet separately from other wavelets (thus forming individual hashes rather than a hash tree).

In some embodiments, the processor may output the tree structure as a persona representing the individual. For example, the persona may be stored for later use in prediction, personalization, and/or risk assessment, as described herein.

In some embodiments, the processor may convert the Bayesian wavelets to tensors that are output with the tree structure. For example, a tensor may represent an array that satisfies one or more mathematical rules (for example, a tensor may be a multi-dimensional array with respect to one or more valid bases of a multi-dimensional space). In such embodiments, the processor may convert the wavelets to tensors using a moving average. For example, a simple moving average, a cumulative moving average, a weighted moving average, or the like, may be used to convert the wavelets to tensors. In certain aspects, the processor may convert the wavelets to tensors using an exponential smoothing average. By using an exponential smoothing average, the natural base e may be incorporated into the smoothing. Because e represents the limit of compound interest, the smoothed wavelet may be easier to identify as anomalous within a financial market. Accordingly, the processor may perform a discrete wavelet transform with an exponential smoothing average accumulator to transform the wavelets into tensors.

According to another aspect of the present disclosure, a processor may receive a plurality of tree structures representing individuals. As described above, each tree structure including Bayesian wavelets and Markovian wavelets governing transitions between the Bayesian wavelets. The data structures may be received from one or more memories (e.g., a volatile memory such as a random access memory (RAM) and/or a non-volatile memory such as a hard disk) and/or across one or more computer networks (e.g., the Internet, a local area network (LAN), or the like). The data structures may represent transactions having associated properties (such as time, location, merchant, amount, etc.), reservations having associated information (such as a name, an identification number, a time, a merchant, etc.), emails sent to a person, or any other discrete event represented in a bundle of data.

In some embodiments, the processor may group the Bayesian wavelets in the tree structures by coefficients. For example, each wavelet may include one or more coefficients (e.g., in a Fourier series representing the oscillation). Accordingly, the processor may group the wavelets by these coefficients. Additionally or alternatively, in embodiments using tensors as described below, each tensor includes coefficients for each base in the set of bases representing a corresponding multi-dimensional space in which the tensor may be represented. Accordingly, the processor may group the tensors (and therefore, the corresponding wavelets) by these coefficients. Because the coefficients depend on the bases selected (which must satisfy one or more mathematical rules in order to form a mathematically consistent multi-dimensional space), the processor may generate a plurality of groups of coefficients and, thus, a plurality of groupings of the tensors (with the corresponding wavelets). For example, the processor may select bases depending on which factors are most heavily weighted in one or more predictive models and then perform a plurality of groupings, each for a particular model (or set of models) having factors corresponding to the bases used to determine the corresponding group.

In some embodiments, the processor may train a neural network for each group independently of other groups. Although "neural network" usually refers to a traditional artificial neural network, the processor here may train any model (e.g., the models discussed above with respect to the groupings) that produces a likelihood of a particular wavelet (or corresponding tensor) being anomalistic within a group. By training each group independently, the processor may develop specialized models that are orders of magnitude greater in number (and, therefore, accuracy) than extant neural networks. For example, the processor may develop thousands (or even millions) of models without requiring exponentially more resources than used to construct a single artificial neural network.

In some embodiments, the processor may integrate the neural networks into a deep field network. For example, the models may be combined into a larger predictive scheme. In one particular example, the models may be combined such that when a new wavelet (or corresponding tensor) is convolved (or otherwise combined with the models), the model trained on the group (or groups) having the most similar coefficients will be amplified while other models (e.g., trained on groups with less similar coefficients) will be minimized.

In some embodiments, the processor may further convert the Bayesian wavelets to tensors further used to train the neural network for each group. For example, as explained above, the processor may convert the wavelets to tensors using a moving average. For example, a simple moving average, a cumulative moving average, a weighted moving average, or the like, may be used to convert the wavelets to tensors. In certain aspects, the processor may convert the wavelets to tensors using an exponential smoothing average. By using an exponential smoothing average, the natural base e may be incorporated into the smoothing. Because e represents the limit of compound interest, the smoothed wavelet may be easier to identify as anomalous within a financial market. Accordingly, the processor may perform a discrete wavelet transform with an exponential smoothing average accumulator to transform the wavelets into tensors.

According to another aspect of the present disclosure, a processor may receive a new data structure related to an individual. For example, as explained above, the new data structure may be received from one or more memories (e.g., a volatile memory such as a random access memory (RAM) and/or a non-volatile memory such as a hard disk) and/or across one or more computer networks (e.g., the Internet, a local area network (LAN), or the like). The new data structure may represent a transaction having associated properties (such as time, location, merchant, amount, etc.), reservation having associated information (such as a name, an identification number, a time, a merchant, etc.), email sent to the individual, or any other discrete event represented in a bundle of data.

In some embodiments, the processor may convert the data structure into a Bayesian wavelet. Moreover, using a tree structure of existing Bayesian wavelets associated with the individual, the processor may calculate one or more harmonics. For example, as explained with respect to FIG. 5, Markovian wavelets may describe transition probabilities between the Bayesian wavelets from which the harmonics may be calculated.

In some embodiments, the processor may determine a measure of whether the Bayesian wavelet alters the one or more harmonics. In some embodiments, the "measure" may refer to a percentage (e.g., 50%, 60%, 70%, etc.), a set of odds (e.g., 1:3, 1 in 5, etc.), a score (e.g., 1 out of 5, 5.6 out of 10.0, etc.), an indicator (e.g., "not likely," "likely," "very likely," etc.), or the like. Additionally or alternatively, the "measure" may refer to a magnitude and/or direction (depending on whether the measure is a scalar or a vector) to the one or more harmonics caused by the new wavelet.

In some embodiments, the processor may add the Bayesian wavelet to the tree structure when the measure is below a threshold. For example, the processor may add the new wavelet to the tree structure when the likelihood is below a threshold. If the processor rejects the new wavelet, the processor may send a notification to such effect. For example, the processor may send a rejection signal or a message indicating the likelihood and/or a reason (e.g., based on the one or more models) for rejection. The processor may send the notification to one or more parties associated with the new wavelet (e.g., a financial institution, an individual, a merchant, or the like) and/or to one or more computer systems from which the new wavelet was received (e.g., a personal computer such as a desktop computer or mobile phone, a point-of-service system, a financial processing server, a credit bureau server, or the like).

Accordingly, as explained above, the harmonics may be used to detect anomalies. Additionally or alternatively, one or more models (e.g., trained as described above) may be applied to new wavelets to detect anomalies.

In one example using models to detect anomalies, the processor may further convert the Bayesian wavelet to a tensor. In such embodiments, the measure of whether the Bayesian wavelet alters the one or more harmonics may be based on a differential field between the tensor and a field representing the tree structure.

For example, the processor may have performed a discrete wavelet transform with an exponential smoothing average accumulator to transform one or more Bayesian wavelets of the tree structure into tensors and then obtain the field by mapping the tensors onto a manifold (e.g., a differential manifold). One or more atlases may be used in order to do so. In some embodiments, the difference field may represent a tensor product of fields (i.e., between a field having only the tensor corresponding to the new Bayesian wavelet and the field having Bayesian wavelets from the tree structure represented as tensors). Accordingly, the difference field may represent a Galois connection between the tensor and the field.

In some embodiments, processor may perform a weighted summation of the difference field to produce a difference vector. For example, the coefficient weights may be derived from training of one or more particular models. For example, the processor may apply a variety of models in the weighting, such as models trained for particular identifiers (e.g., particular tree structures, particular merchants, particular institutions, etc.), particular times (e.g., time of day, time of year, etc.), particular locations (e.g., particular country, particular city, particular postal code, etc.), or the like.

Additionally or alternatively, the summation may include a notch filter. Accordingly, particular frequencies may be filtered out during the summation. For example, the processor may apply one or more particular models to determine which particular frequencies to filter out. The one or more filter models may be the same models as the one or more weighting models or may be different models.

In some embodiments, an absolute or a squaring function may be applied. Alternatively, the weighted summation may produce a directional difference vector. Accordingly, the difference vector may include a direction of the difference as well as a magnitude of the difference. This additional information may improve accuracy of the anomaly detection. For example, a large difference vector pointing in an expected direction may be less anomalous than a small difference vector pointing in an unexpected direction. Accordingly, at least one of a harmonic difference (whether scalar or vector) or a difference field may be used to assess how anomalous a new wavelet is.

The anomalousness of a new wavelet may represent its risk. As used herein, "risk" refers to any quantification of the probability of an event being unrelated to or unauthorized by a person, such as a transaction being lost (e.g., via automatic decline, insolvency of the purchaser, fraudulency, or the like), a reservation being cancelled (e.g., due to accidental or fraudulent booking or the like). Accordingly, "high risk" may refer to any level of risk that exceeds an acceptable level, whether the acceptable level be predetermined or dynamically determined (e.g., certain purchasers, merchants, regions, times of day, or the like may have differing acceptable levels of risk).

Based on riskiness, the processor may authorize or deny a new event (e.g., reject new data from sensors, such as a video or audio recording, as unrelated to the individual, deny a new transactions, require a deposit for a new reservation, or the like). For example, the processor may authorize the event when the likelihood is below a threshold. If the processor rejects the new wavelet, the processor may send a notification to such effect. For example, the processor may send a rejection signal or a message indicating the likelihood and/or a reason (e.g., based on the one or more models) for rejection. The processor may send the notification to one or more parties associated with the new wavelet (e.g., a financial institution, an individual, a merchant, or the like) and/or to one or more computer systems from which the new wavelet was received (e.g., a personal computer such as a desktop computer or mobile phone, a point-of-service system, a financial processing server, a credit bureau server, or the like).

In some embodiments, based on the likelihood, the processor may request additional information. For example, as explained above, the processor may request a deposit before authorizing a reservation. In another example, the processor may request manual verification before authorizing a transaction. For example, if the likelihood is above a first threshold but below a second threshold, the processor may send one or more messages to one or more parties associated with the new wavelet (e.g., a financial institution, an individual, a merchant, or the like) with a request to provide a deposit, send manual confirmation, or the like. In such an example, the processor may send a message to a mobile phone and/or email address of the individual to request that the new wavelet be verified (e.g., by sending a "Y," "yes," or other affirmative response), that a deposit be provided (e.g., via credit card or the like). Additionally or alternatively, the processor may send a message to a merchant warning that a suspicious transaction has been processed and that the merchant will be denied future transactions if the number of suspicious transactions in a period of time exceeds a threshold. In another example, the processor may send a message to a merchant warning that a higher-risk reservation has been processed and including an indication of the risk of cancellation.

In some embodiments, the harmonics and/or model(s) may additionally or alternatively be used for prediction or personalization. For example, the harmonics may be used to determine effective channels for communication (e.g., email or phone or the like), effective offers to send (e.g., to produce a transaction or other engagement), topics of interest (e.g., for a search engine to return or otherwise promote), or the like. Additionally or alternatively, the model(s) may determine the same.

Turning now to FIG. 1, there is shown an example of a tree structure. For example, hG1, hG2, and hGn represent Bayesian wavelets within the tree structure. As shown in FIG. 1, hash values associated with these Bayesian wavelets are connected to corresponding wavelets in the tree structure. As further depicted in FIG. 1, one or more Bayesian wavelets may transform over time, e.g., wavelets hG2 and hGn transform to hG3 and are thus connected to hG3 in the tree. The tree structure shown in FIG. 1 may comprise a portion of a tree structure used in any of the embodiments described below. The hash values shown in FIG. 1 may allow for anonymized use of wavelets included in the tree structure (e.g., for demographic calculations or the like). Alternatively, embodiments described below may comprise Bayesian wavelets in a tree structure without any corresponding hash values. For example, non-anonymous processing of data (e.g., to authorize transactions or the like).

Figure 2:
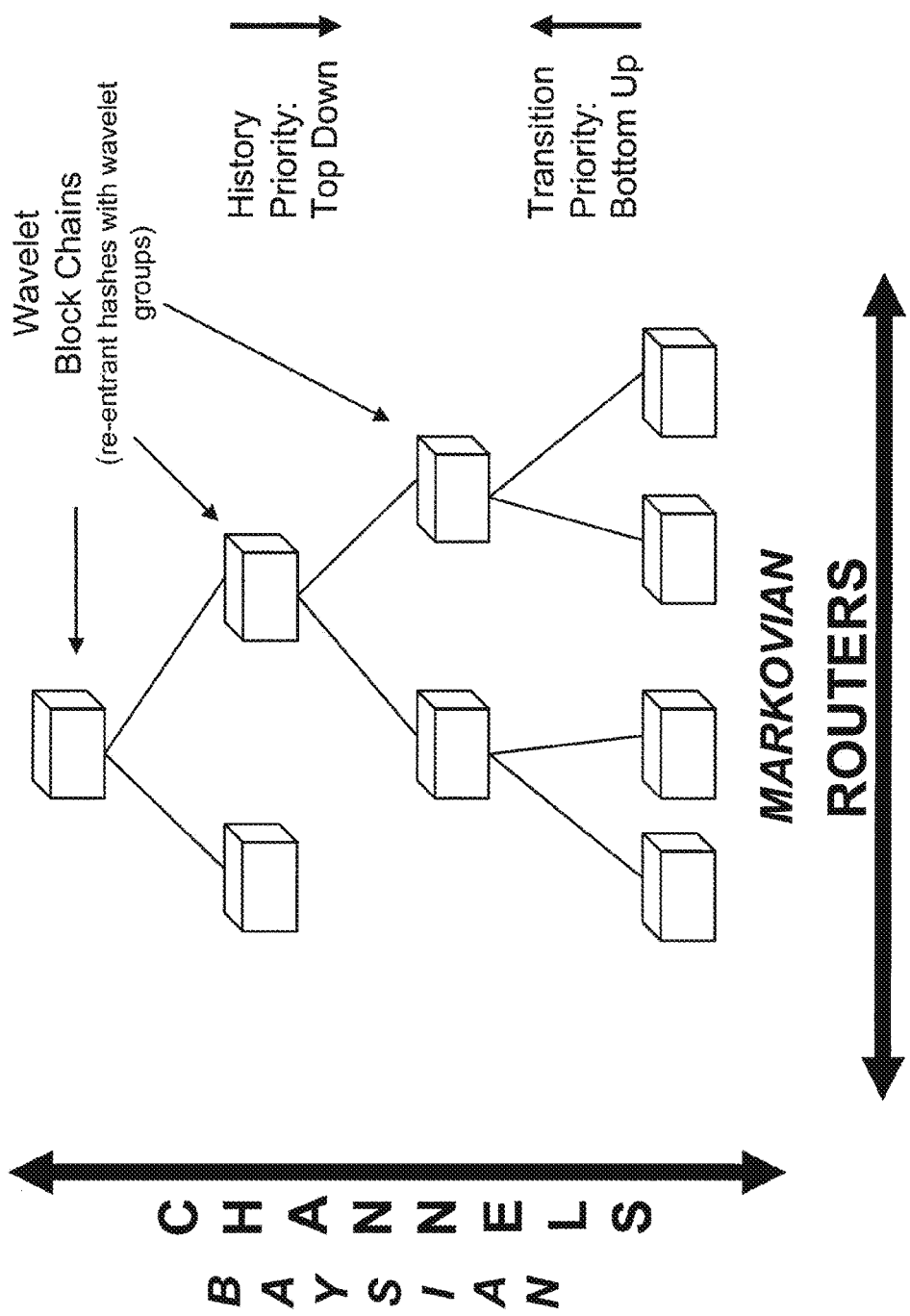
FIG. 2 is another diagram of a wavelet tree structure, according to an exemplary embodiment of the present disclosure.

FIG. 2 depicts an exemplary tree structure. The tree structure shown in FIG. 2 includes only Bayesian wavelets but may also include hash values, as depicted in FIG. 1. As shown in FIG. 2, the Bayesian wavelets are organized along a vertical axis according to history; accordingly, as Bayesian wavelets transform over time, the updated wavelets are added further down the tree from the previous wavelets. Similarly, alternate states are arranged along a horizontal axis. Accordingly, the horizontal axis is associated with Markovian wavelets while the vertical axis is associated with Bayesian wavelets. As Bayesian wavelets transform over time, new possible wavelets are added with the most likely possibilities further down than less likely possibilities. Moreover, as shown in FIG. 2, the wavelets may be grouped along the vertical axis by channel.

Figure 3:
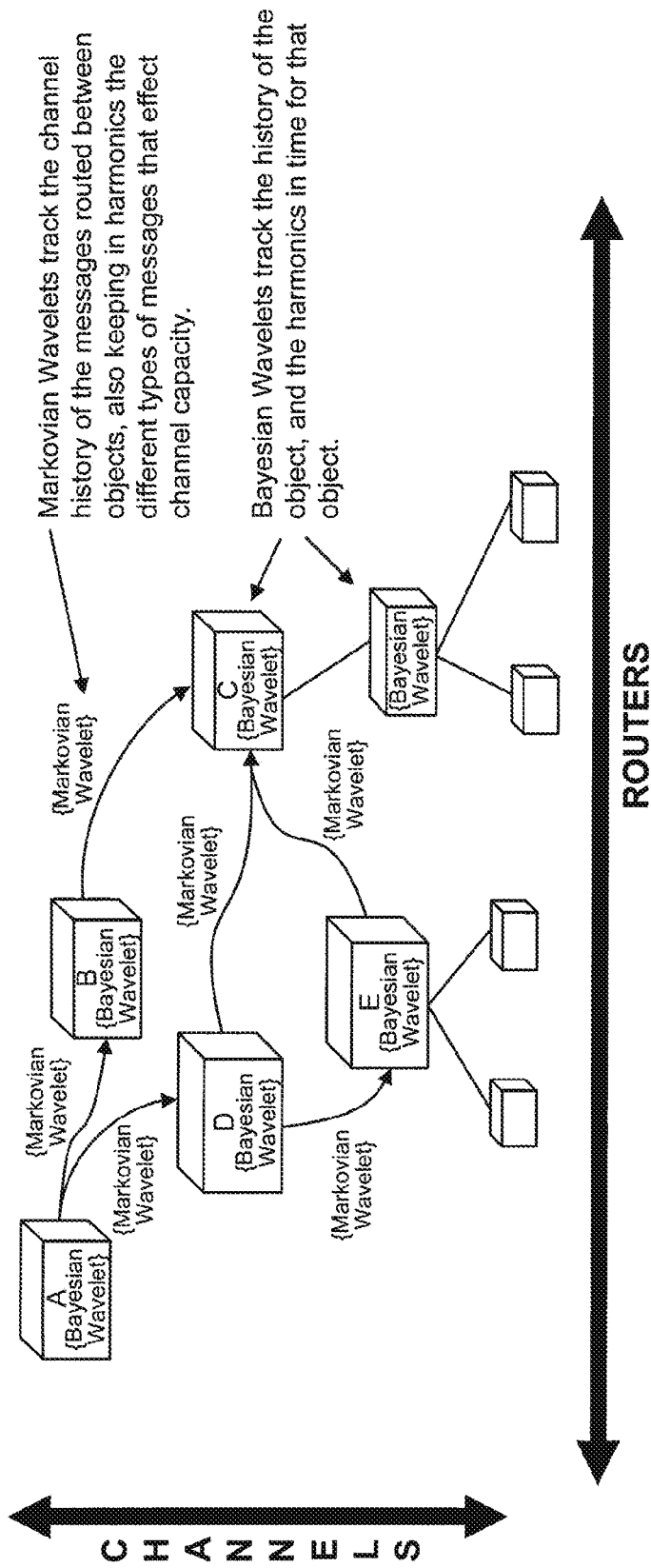
FIG. 3 is a diagram of a Markovian wavelets governing transitions between Bayesian wavelets, according to an exemplary embodiment of the present disclosure.

FIG. 3 depicts the exemplary tree structure of FIG. 2 with additional detail. In particular, Markovian wavelets that govern transitions between the Bayesian wavelets are depicted. As explained in FIG. 3, Markovian wavelets track transitions between Bayesian wavelets, whether across time (e.g., from initiation to completion of a transaction or reservation or the like) or across channels (e.g., from an email to a corresponding transaction, from a phone call to a corresponding reservation, or the like). Harmonics may be determine from the Bayesian wavelets, the Markovian wavelets, or both.

Figure 4:
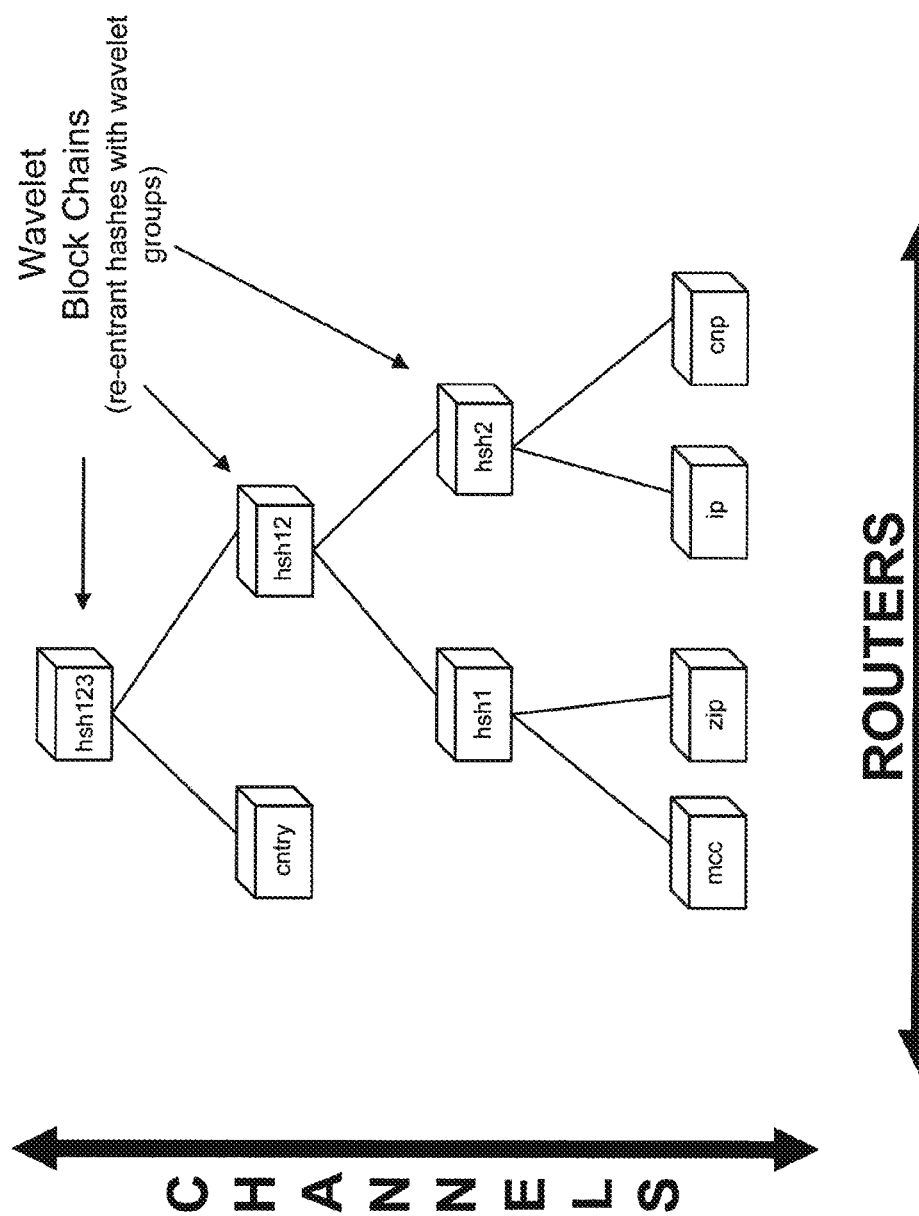
FIG. 4 is a diagram of a hashed tree structure, according to an exemplary embodiment of the present disclosure.

FIG. 4 depicts the exemplary tree structure of FIG. 2 with a hash tree such as that of FIG. 1. As depicted in FIG. 4, a merchant category code (mcc) may be hashed with a corresponding zip code of a first transaction. Moreover, a card not present (cnp) indicator may be hashed with a corresponding Internet protocol (ip) address of a second transaction. The two transactions may be hashed together if related (e.g., by time, by merchant, by individual, or the like). Moreover, both transactions may further be hashed with an indication of a country (cntry) in which they were performed. Thus, a tree structure similar to a Merkle tree may form at least part of the tree structures generated and used in embodiments of the present disclosure.

Figure 5:
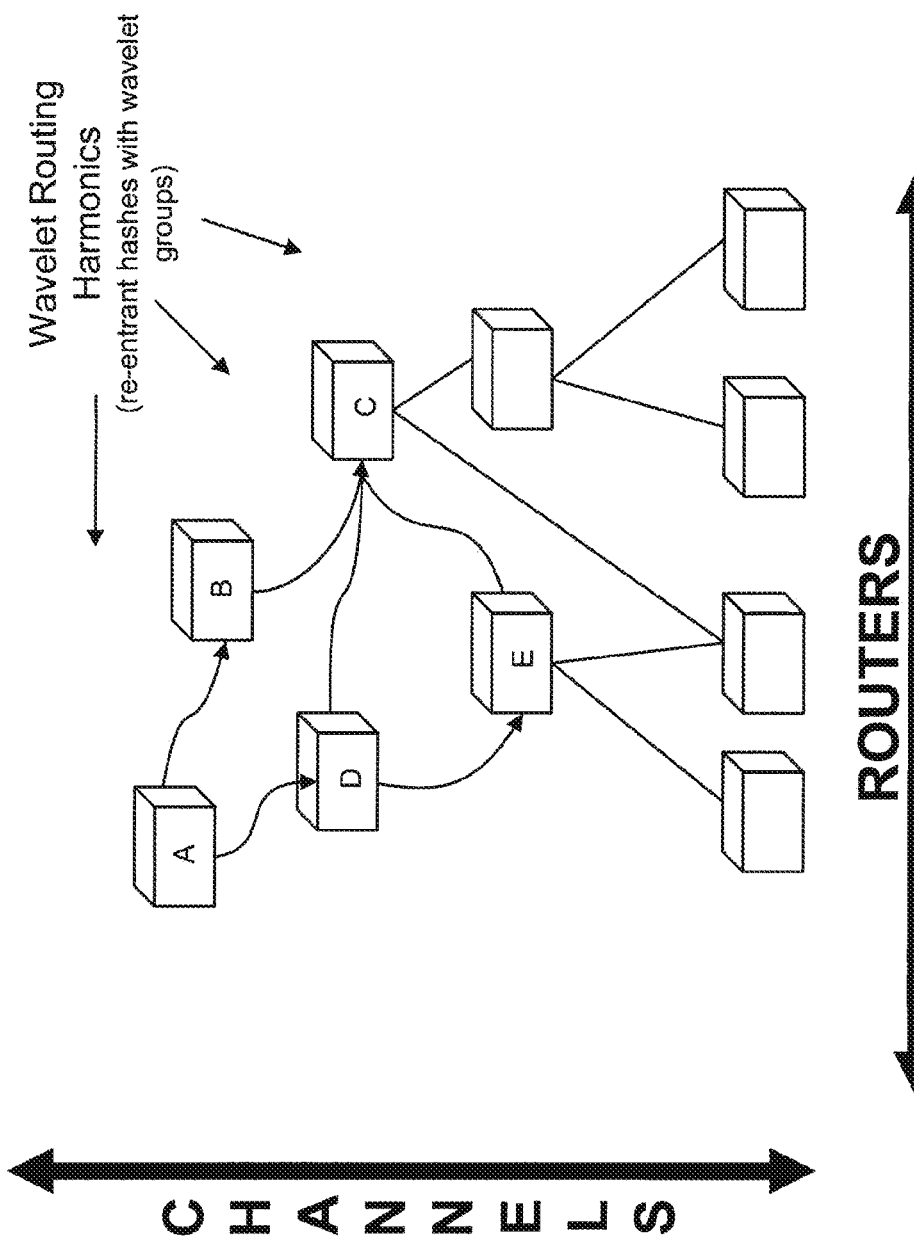
FIG. 5 is a diagram of harmonics within a tree structure, according to an exemplary embodiment of the present disclosure.

FIG. 5 depicts the exemplary tree structure of FIG. 2 with possible harmonics. In particular, the plurality of transitions between Bayesian wavelets may exhibit harmonics that tend toward transitions from wavelet A to wavelet C. These harmonics may allow determination of an effective campaign (e.g., using a communication like wavelet A to trigger a reservation or transaction like wavelet C) or the like. Additionally or alternatively, the harmonics may be used to calculate moving averages of transactions, reservations, or the like. Accordingly, a merchant or other vendor may determine the impact of fraud, charegebacks, cancellations, or the like from the moving averages in a significantly shorter amount of time than with extant systems.

Figure 6:
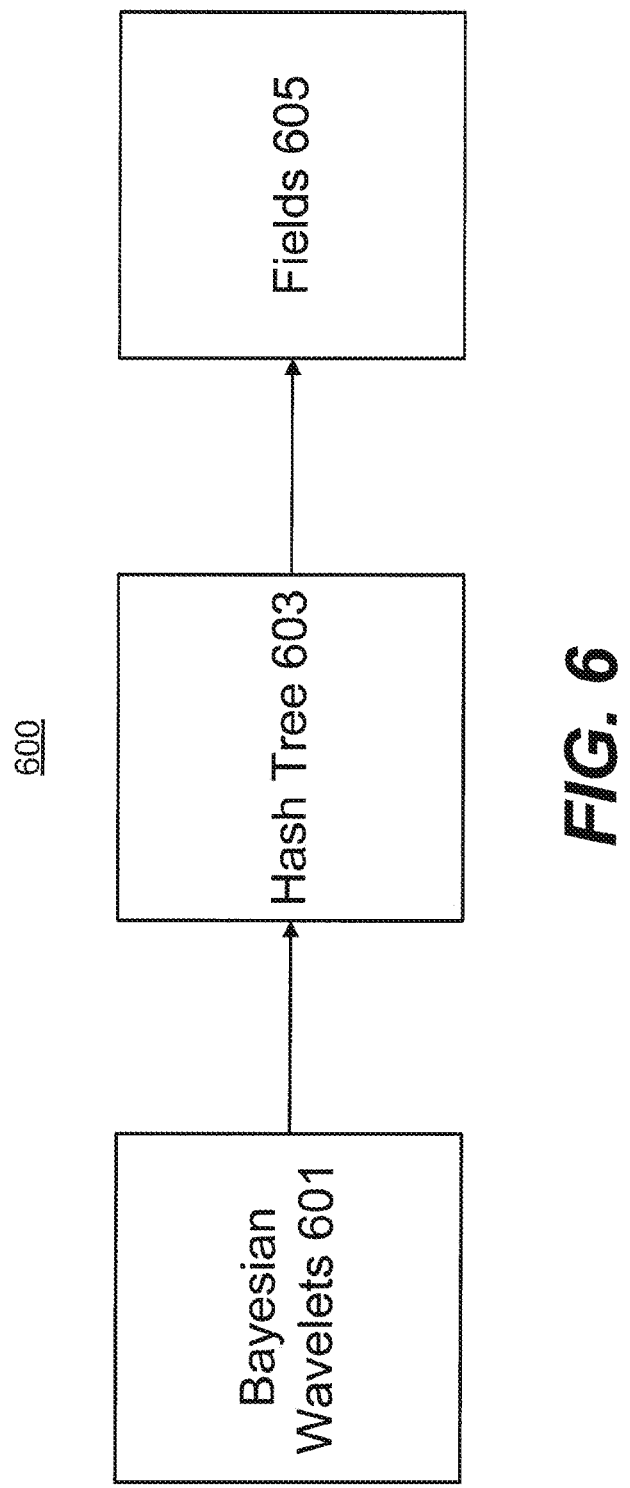
FIG. 6 is a block diagram of an exemplary system for generating tree structures from databases of events, according to an exemplary embodiment of the present disclosure.

FIG. 6 depicts an exemplary system 600 for generating hash trees. System 600 may be implemented on one or more servers, such as detection server 1401 of FIG. 14. The one or more servers may be housed on one or more server farms. As depicted in FIG. 6, system 600 may generate Bayesian wavelets 601, e.g., from one or more data structures associated with an individual, a merchant, or the like. For example, as explained above, the data structures may be received by system 600 (e.g., from one or more memories and/or over one or more computer networks) and thus wavelets 601 may be determined by system 600 based on the data structures (e.g., one or more transactions, one or more reservations, one or more communications, or the like) received by system 600.

As further depicted in FIG. 6, system 600 may convert wavelets 601 to a hash tree 603. For example, as described above, system 600 may organize the Bayesian wavelets along at least one dimension in time such that Bayesian transformations of the wavelets occur along the at least one dimension of tree structure 603 and/or group the Bayesian wavelets within tree structure 603 with respect to channel. Additionally or alternatively, each wavelet may include one or more coefficients (e.g., in a Fourier series representing the oscillation) and thus system 600 may group the wavelets into tree structure 603 by these coefficients.

In some embodiments, although not depicted in FIG. 6, system 600 may perform a discrete wavelet transform (e.g., a cascading convolution) with a smoothing accumulator to transform the wavelets 601 to tensors. In some embodiments, a simple moving average, a cumulative moving average, a weighted moving average, or the like, may be used for smoothing. In certain aspects, the smoothing may be an exponential smoothing average. By using an exponential smoothing average, the natural base e may be incorporated into the smoothing.

In embodiments using tensors as described below, each tensor may include coefficients for each base in the set of bases representing a corresponding multi-dimensional space in which the tensor may be represented. Accordingly, system 600 may group the tensors (and therefore, the corresponding wavelets 601) into tree structure 603 by these coefficients. Because the coefficients depend on the bases selected (which must satisfy one or more mathematical rules in order to form a mathematically consistent multi-dimensional space), system 600 may generate a plurality of groups of coefficients and, thus, a plurality of groupings of the tensors (with the corresponding wavelets 601). Accordingly, a plurality of tree structures 603 may be formed depending on which bases are selected. For example, as explained above, system 600 may select bases depending on which factors are most heavily weighted in one or more predictive models and then perform a plurality of groupings into tree structure, each for a particular model (or set of models) having factors corresponding to the bases used to determine the corresponding tree structure.

In some embodiments, as further depicted in FIG. 6, system 600 may convert tree structure 603 (and/or corresponding tensors) to one or more fields 605. For example, system 600 may use one or more atlases to map tree structure 603 (and/or corresponding tensors) onto one or more manifolds to form one or more fields 605. In some embodiments, system 600 may select the one or more atlases to ensure particular properties of the resulting manifold (e.g., to result in a differential manifold, a smooth manifold, an analytic manifold, a complex manifold, or the like).

Field 605 and/or harmonics from tree structure 603 may be used by system 600 to detect anomalous wavelets, as explained above. For example, system 600 may calculate a difference field between a new wavelet and a corresponding field 605 and may sum the difference field to form a difference vector. Accordingly, the magnitude and/or direction of the difference vector may be used to determine an anomaly likelihood (e.g., using one or more models, as explained above). Additionally or alternatively, a harmonic difference (whether a scalar or vector) may be used to determine an anomaly likelihood (e.g., using one or more models, as explained above).

Figure 7:
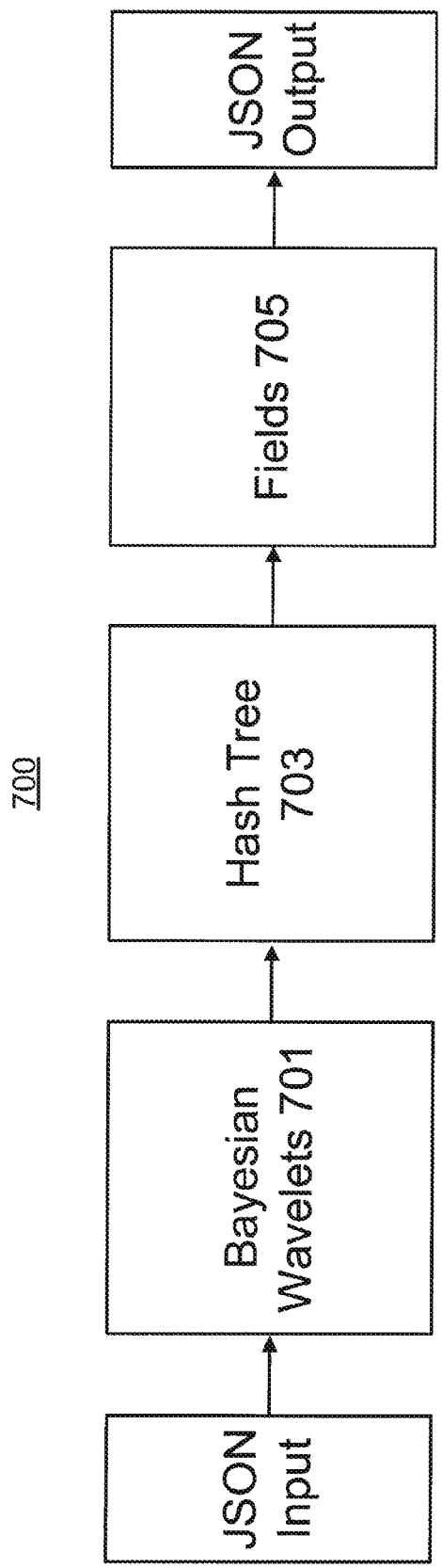
FIG. 7 is another block diagram of an exemplary system for generating tree structures from databases of events, according to an exemplary embodiment of the present disclosure.

FIG. 7 depicts another exemplary system 700 for generating hash trees. System 700 may be implemented on one or more servers, such as detection server 1401 of FIG. 14. The one or more servers may be housed on one or more server farms. Similar to system 600 of FIG. 6, system 700 generates wavelets 701, converts wavelets 701 to a tree structure 703, and maps tree structure 703 (and/or corresponding tensors) to one or more fields 705. In addition, as depicted in FIG. 7, system 700 generates wavelets 701 based on received data structures comprising JavaScript Object Notation (JSON) data. Additional or alternative data serialization formats, such as Extensible Markup Language (XML), YAML Ain't Markup Language (YAML), or the like. Data serialization formats allow for rapid and lightweight transmission of data (e.g., transactions) to system 700. In addition, data serialization formats may allow for direct use of the received data (e.g., for conversion to wavelets or even for direct processing by a discrete wavelet transform) without having to reconstruct a data structure or object therefrom. Furthermore, many extant database structures (such as MongoDB, Oracle NoSQL Database, or the like) support native exportation directly to a data serialization format such as JSON. Accordingly, accepting data serialization formats may allow for faster and more native integration with existing transaction databases.

Figure 8:
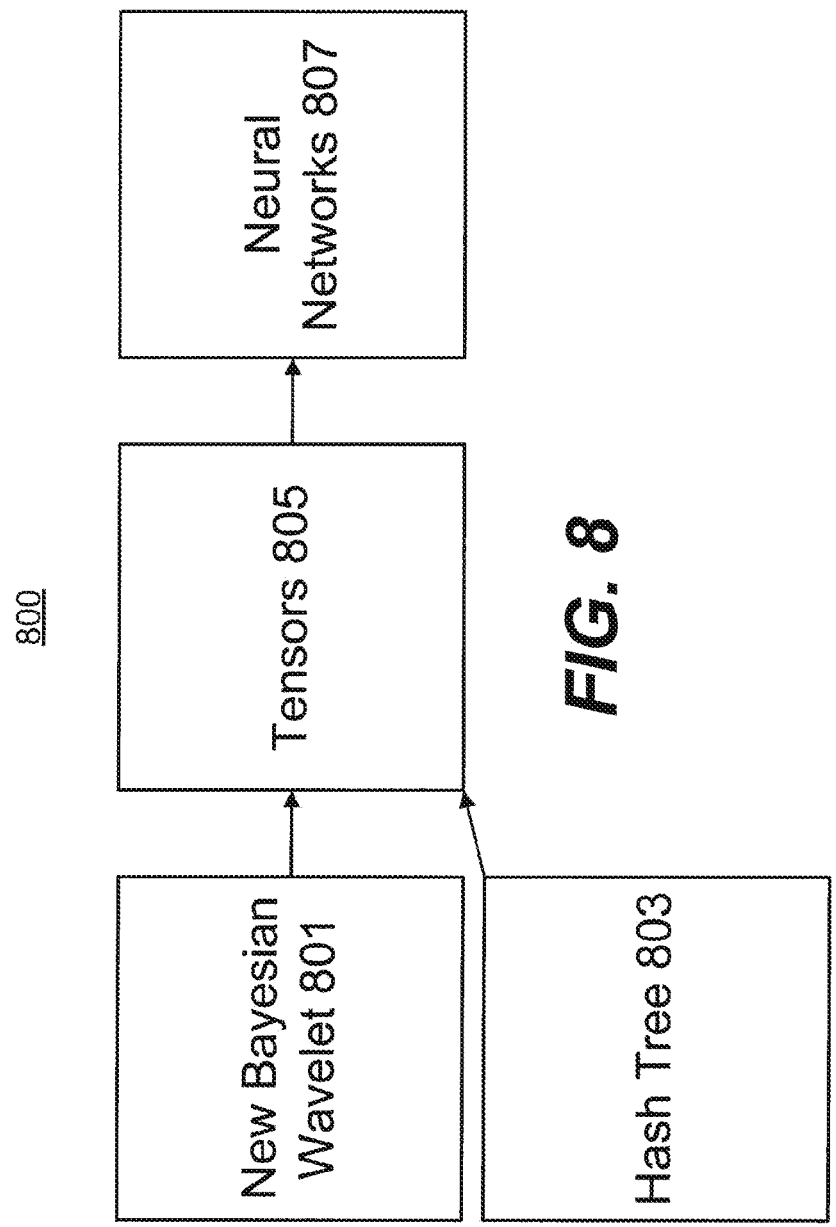
FIG. 8 is a block diagram of an exemplary system for risk detection using tree structures, according to an exemplary embodiment of the present disclosure.

FIG. 8 depicts another exemplary system 800 for detecting anomalous wavelets. System 800 may be implemented on one or more servers, such as detection server 1401 of FIG. 14. The one or more servers may be housed on one or more server farms. As depicted in FIG. 8, system 800 may generate a new Bayesian wavelet 801, e.g., from a new data structures associated with an individual, a merchant, or the like. For example, as explained above, the new data structure may be received by system 800 (e.g., from one or more memories and/or over one or more computer networks) and thus wavelet 801 may be determined by system 800 based on the new data structure (e.g., one or more transactions, one or more reservations, one or more communications, or the like) received.

As further depicted in FIG. 8, system 800 may receive a tree structure 803, e.g., associated with a same individual, merchant, or the like, as new Bayesian wavelet 801. Although depicted as a hash tree, the tree structure may comprise only Bayesian wavelets without hashes. Tree structure 803 may be retrieved by system 800 from one or more memories and/or over one or more computer networks.

As further depicted in FIG. 8, system 800 may convert new wavelet 801 as well as wavelets from tree structure 803 into tensors 805. For example, system 800 may perform a discrete wavelet transform (e.g., a cascading convolution) with a smoothing accumulator to transform the wavelet 801 and wavelets from tree structure 803 to tensors 805. In some embodiments, a simple moving average, a cumulative moving average, a weighted moving average, or the like, may be used for smoothing. In certain aspects, the smoothing may be an exponential smoothing average. By using an exponential smoothing average, the natural base e may be incorporated into the smoothing.

As further depicted in FIG. 8, system 800 may apply one or more models (e.g., neural networks 807) to determine whether new wavelet 801 is anomalous. For example, system 800 may calculate a difference field between the tensor representing new wavelet 801 and a corresponding field representing tensors from tree structure 803 and may sum the difference field to form a difference vector. Accordingly, the magnitude and/or direction of the difference vector may be used to determine an anomaly likelihood (e.g., using one or more models 807). Additionally or alternatively, although not depicted in FIG. 8, a harmonic difference (whether a scalar or vector) between wavelet 801 and tree structure 803 may be used to determine an anomaly likelihood (e.g., using one or more models 807).

Figure 9:
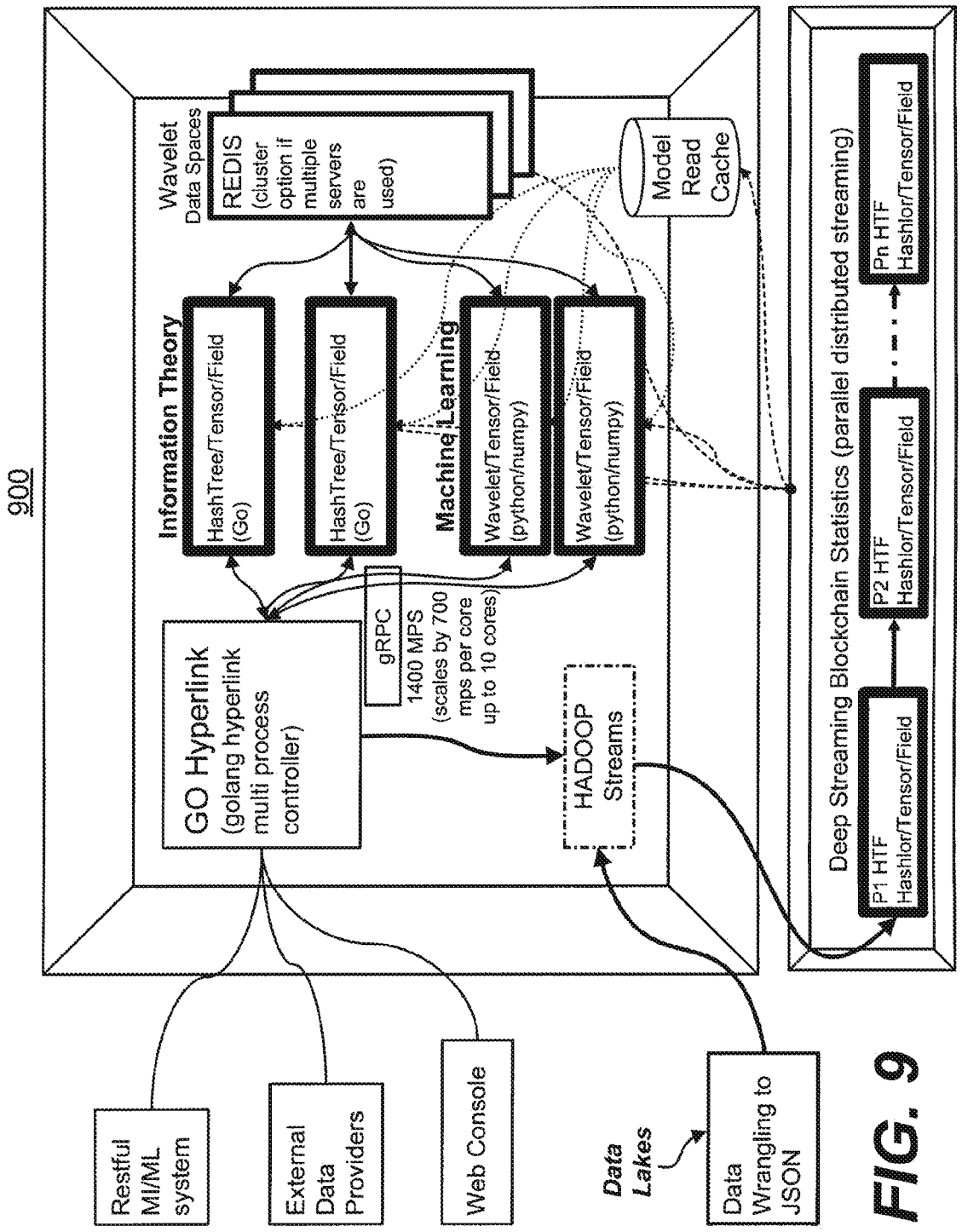
FIG. 9 is a diagram of an exemplary system for generating and using tree structures, according to an exemplary embodiment of the present disclosure.

FIG. 9 depicts an exemplary system 900 for generating and using tree structures as described herein. For example, system 900 may represent an additional or alternative device to detection server 1401 of FIG. 14 for implementing methods disclosed herein.

As depicted in FIG. 9, one or more sources of data structures for systems of the present disclosure may include one or more data lakes comprising a distributed file system (such as Apache Hadoop or the like) that are sent through a stream and output as JSON objects. Although not depicted in FIG. 9, additional sources may include one or more data lakes comprising images (such as Microsoft Azure Data Lake or the like), one or more real-time online transaction processing systems (RT-OLTPS) (such as PayPal or the like), and/or one or more data oceans (such as JSON objects exchanged using a Representational State Transfer (REST) protocol, XML objects exchanged using a Simple Object Access Protocol (SOAP), or the like). Additional sources may include a user interface (e.g., depicted as a web console in FIG. 9), external data providers (e.g., third-party servers), or the like. Although depicted as using JSON objects, other data serialization formats such as XML, YAML, or the like, may be used in lieu of or in combination with JSON objects.

A multi-process controller (depicted as the go hyperlink controller in FIG. 9 but may comprise any appropriate controller) may manage the different data feeds providing data structures for conversion to wavelets. As depicted in FIG. 9, one or more information theory processes may convert incoming data structures to trees of wavelets, wavelets to tensors, and/or tensors to fields, as described herein. As explained above, the trees, tensors, and/or fields may be stored, e.g., in Redis or any other appropriate database protocol. In addition, one or more models may be trained on the trees, tensors, and/or fields (e.g., according to method 1100 of FIG. 11) and then stored in a cache for later use. Although depicted as local, the storages may additionally or alternatively be remote from system 900.

As further depicted in FIG. 9, statistics may be read off the trees, tensors, and/or fields in real time. For example, as explained above, harmonics of the tree structures may be used to determine moving averages for any variables included in or associated with the data structures input into system 900. As shown in FIG. 9, multiple statistics may be read off in parallel in real time. Accordingly, the tree structures of the present disclosure may allow for faster and more accurate statistics provided to owners of the data structures.

Figure 10:
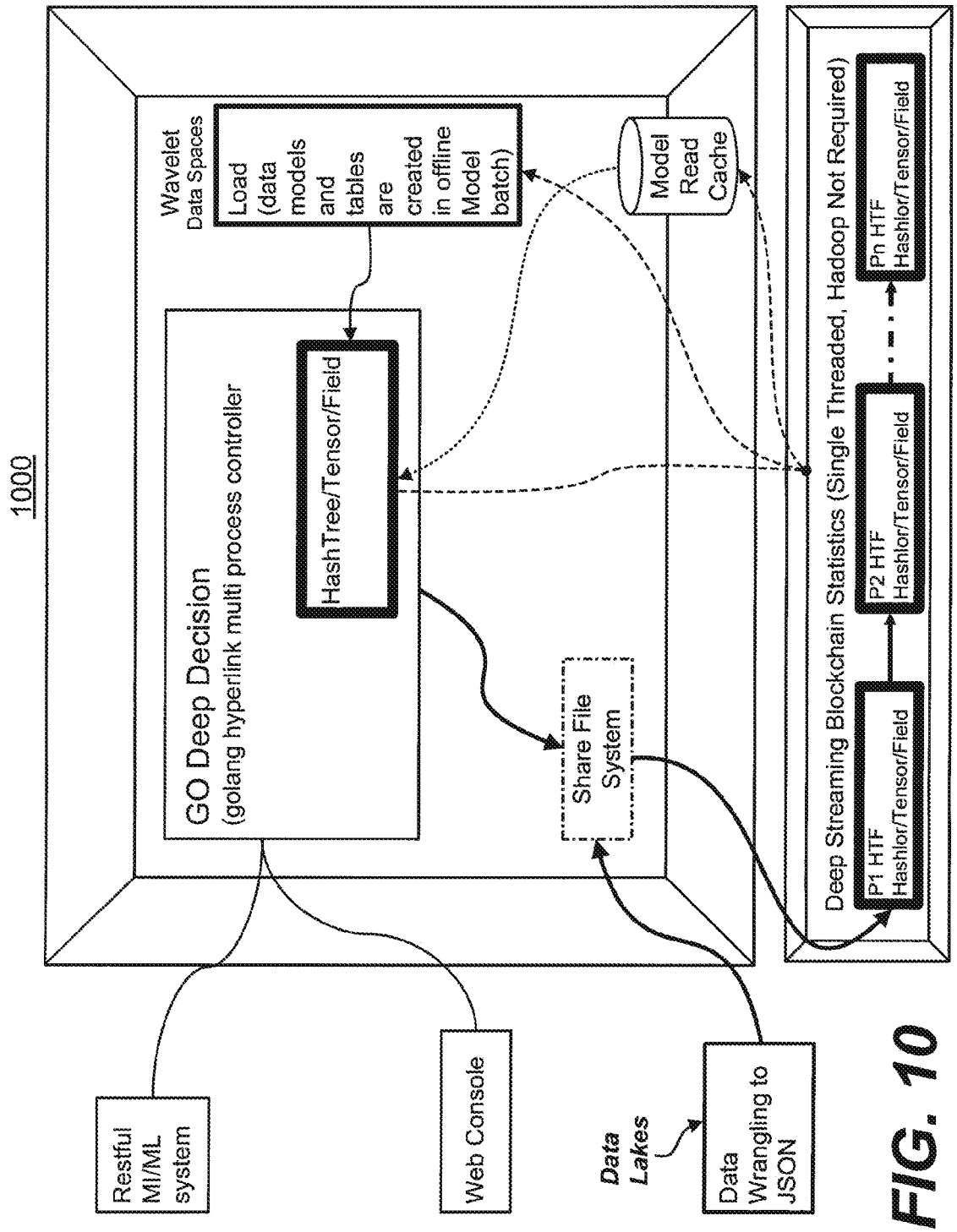
FIG. 10 is a diagram of another exemplary system for generating and using tree structures, according to an exemplary embodiment of the present disclosure.

FIG. 10 depicts an exemplary system 1000 of constructing and using a database comprising discrete wavelets. For example, system 1000 may represent an additional or alternative device to detection server 1401 of FIG. 14 for implementing methods disclosed herein. System 1000 may provide for a faster generation and use of tree structure than system 900, described above. For example, system 1000 may use fewer data sources and/or omit model generation to provide for faster conversion of input data structures and reduce overhead. System 1000 may still provide real time statistics to owners of the data structures while using fewer resources than system 900.

Figure 11:
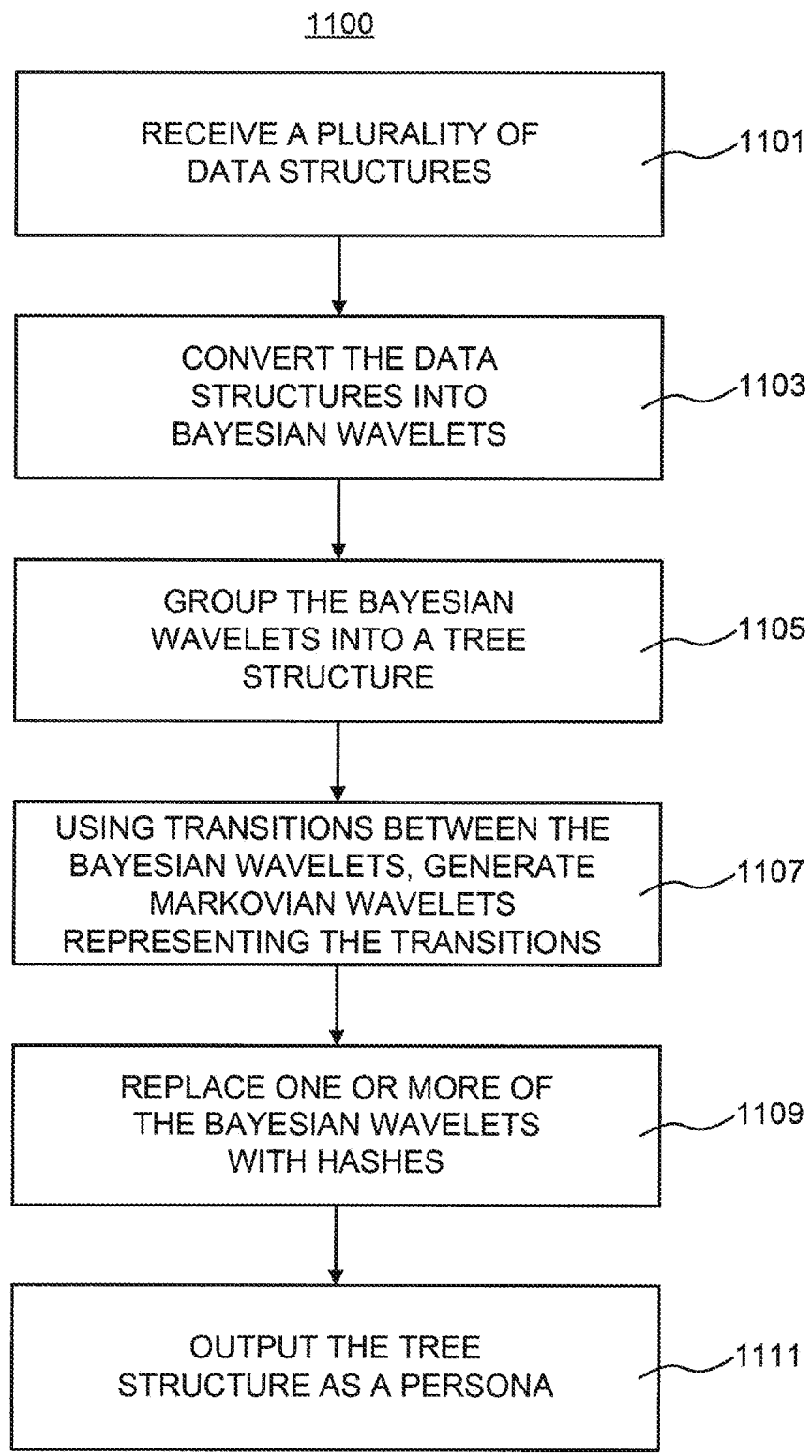
FIG. 11 is a flowchart of an exemplary method for generating a persona using a hash tree, according to an exemplary embodiment of the present disclosure.

FIG. 11 is a flowchart of exemplary method 1100 for generating a persona using a hash tree. Method 1100 may be implemented using a general-purpose computer including at least one processor, e.g., detection server 1401 of FIG. 14. Alternatively, a special-purpose computer may be built for implementing method 1100 using suitable logic elements.

At step 1101, a plurality of data structures related to an individual. The data structures may be received from one or more memories and/or across one or more computer networks. For example, the processor may receive a transaction having associated properties (such as time, location, merchant, amount, etc.), a reservation, or the like. The data structure may be received in and/or converted to one or more data serialization formats, such as JSON, XML, YAML, etc.

At step 1103, the processor may convert the data structures into a plurality of Bayesian wavelets. The wavelet need not be received in the form of an oscillation but may be represented in any appropriate form (e.g., an array, a digital signal, or the like). Accordingly, the processor may convert the data structures to arrays or any other appropriate data form representing the Bayesian wavelets.

In some embodiments, the processor may further convert the Bayesian wavelets to tensors. For example, as explained above, the processor may convert the wavelet to a tensor based using a moving average, such as a simple moving average, a cumulative moving average, a weighted moving average, an exponential moving average, or the like. Accordingly, the processor may perform a cascading convolution (e.g., with one or more filter banks) followed by an accumulation (e.g., using the moving average for smoothing) to transform the received wavelet into a tensor.

At step 1105, the processor may group the Bayesian wavelets into a tree structure. For example, as explained above, the processor may organize the Bayesian wavelets along at least one dimension in time such that Bayesian transformations of the wavelets occur along the at least one dimension. Additionally or alternatively, the processor may group the Bayesian wavelets with respect to channel. For example, the source of the data structures (and, thus, of the corresponding Bayesian wavelets) may comprise the channel. Accordingly, the processor may group Bayesian wavelets representing emails separately from Bayesian wavelets representing phone call logs, Bayesian wavelets representing brick-and-mortar transactions separately from Bayesian wavelets representing online transactions, or the like Each Bayesian wavelet may include one or more coefficients (e.g., in a Fourier series representing the oscillation). Accordingly, the processor may group the wavelets into a tree structure by these coefficients. Additionally or alternatively, in embodiments using tensors as described above, each tensor may include coefficients for each base in the set of bases representing a corresponding multi-dimensional space in which the tensor may be represented. Accordingly, the processor may group the tensors (and therefore, the corresponding wavelets) into the tree structure by these coefficients. Because the coefficients depend on the bases selected (which must satisfy one or more mathematical rules in order to form a mathematically consistent multi-dimensional space), the processor may generate a plurality of groups of coefficients and, thus, a plurality of groupings of the tensors (with the corresponding wavelets). Accordingly, a plurality of tree structures may be formed depending on which bases are selected. For example, the processor may select bases depending on which factors are most heavily weighted in one or more predictive models and then perform a plurality of groupings into tree structure, each for a particular model (or set of models) having factors corresponding to the bases used to determine the corresponding tree structure.

At step 1107, using transitions between the Bayesian wavelets within the tree structure, the processor may generate a plurality of Markovian wavelets representing the transitions. For example, the processor may generate matrices, arrays, or any other data structures comprising the Markovian wavelets that describe transition probabilities between the Bayesian wavelets.

At step 1109, the processor may replace one or more of the Bayesian wavelets with hashes. For example, the processor may apply a hash function to one or more values (e.g., properties, metadata, or the like) included in the Bayesian wavelet). In some embodiments, the processor may generate hash trees (e.g., Merkle hash trees or the like) to include in the overall tree structure.

At step 1111, the processor may output the tree structure (or, in some embodiments, the plurality of tree structures) as a persona representing the individual. In embodiments where the processor calculated tensors, the processor may further output the tensors.

The tree structure generated by method 1100 may have various uses. For example, as explained above, the processor may calculate one or more harmonics based on the Markovian wavelets (and/or the Bayesian wavelets) and use the harmonics to determine whether a new wavelet is anomalous (e.g., if it alters the harmonics by more than a threshold) and/or to calculate moving averages of properties associated with the wavelets. In another example, the processor may determine an effective channel of communication or other personalization for an individual or other entity to produce a particular outcome (e.g., initialization of a transaction, non-cancellation of a reservation, or the like). In yet another example, the processor may calculate a field based on the tree structure and use the field to determine a difference vector to see if a tensor associated with a new wavelet is anomalous (e.g., based on one or more thresholds applied to the difference vector).

Figure 12:
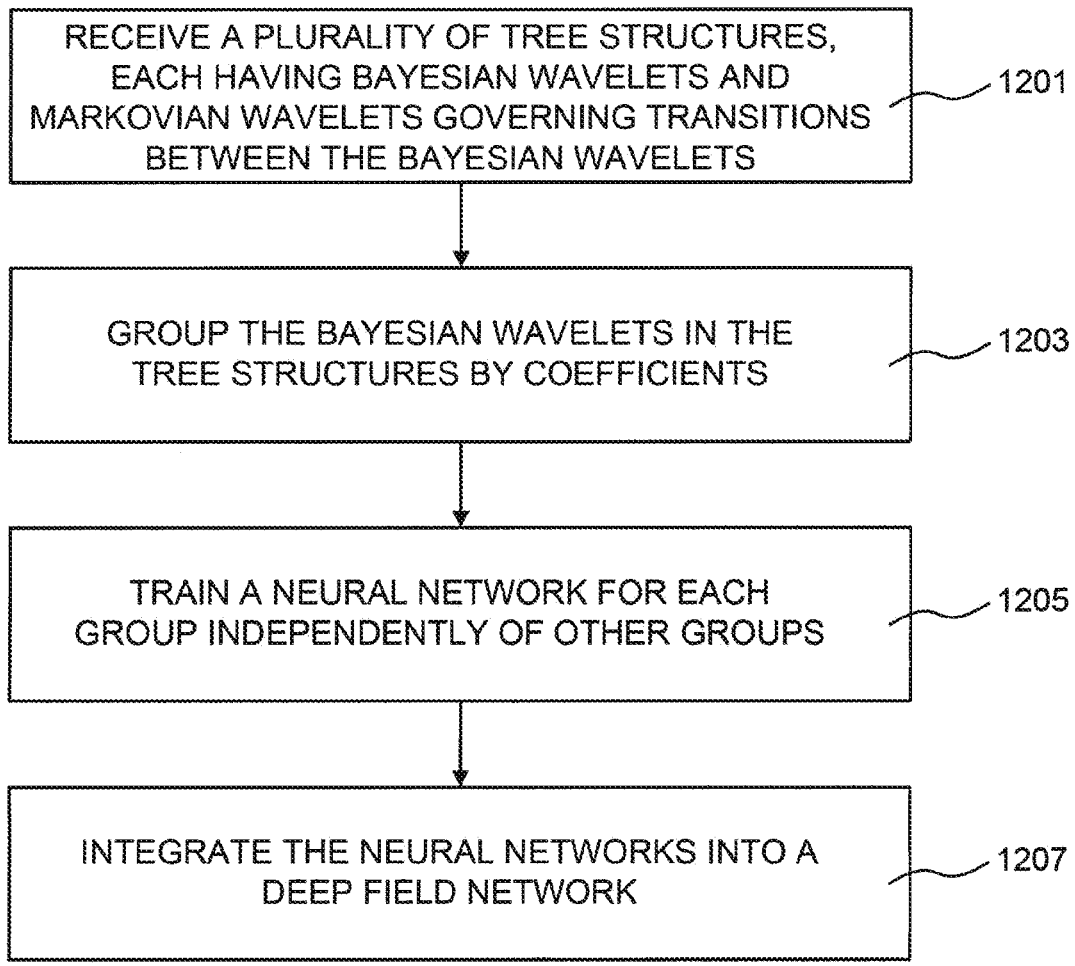
FIG. 12 is a flowchart of an exemplary method for training a deep field network to detect anomalies within a hash tree, according to an exemplary embodiment of the present disclosure.

FIG. 12 is a flowchart of exemplary method 1200 for training a deep field network to detect anomalies within a hash tree. Method 1200 may be implemented using a general-purpose computer including at least one processor, e.g., detection server 1401 of FIG. 14. Alternatively, a special-purpose computer may be built for implementing method 1200 using suitable logic elements.

At step 1201, a processor may receive a plurality of tree structures representing individuals. Each tree structure may include Bayesian wavelets and Markovian wavelets governing transitions between the Bayesian wavelets. For example, the processor may receive a tree structure representing an individual, a merchant or other vendor, a location, or the like. The tree structure may be received in and/or converted to one or more data serialization formats, such as JSON, XML, YAM L, etc.

At step 1203, the processor may group the Bayesian wavelets in the tree structures by coefficients. For example, as explained above, each wavelet may include one or more coefficients (e.g., in a Fourier series representing the oscillation). Accordingly, the processor may group the wavelets by these coefficients. Additionally or alternatively, in embodiments using tensors as described below, each tensor includes coefficients for each base in the set of bases representing a corresponding multi-dimensional space in which the tensor may be represented. Accordingly, the processor may group the tensors (and therefore, the corresponding wavelets) by these coefficients. Because the coefficients depend on the bases selected (which must satisfy one or more mathematical rules in order to form a mathematically consistent multi-dimensional space), the processor may generate a plurality of groups of coefficients and, thus, a plurality of groupings of the tensors (with the corresponding wavelets). For example, the processor may select bases depending on which factors are most heavily weighted in one or more predictive models and then perform a plurality of groupings, each for a particular model (or set of models) having factors corresponding to the bases used to determine the corresponding group.

At step 1205, the processor may train a neural network for each group independently of other groups. The processor at step 1205 may train any model (e.g., the models discussed above with respect to the groupings) that produces a likelihood of a particular wavelet being anomalistic within a tree structure. As used herein, the term "train" refers to the adjustment of one or more parameters of the model (such as coefficients, weights, constants, or the like) to increase accuracy of the model (e.g., to match known properties of the wavelets in each group).

Additionally with or alternatively to training a neural network for each group, the processor may train each neural network specific to at least one of a particular tree structure, a particular location, or a particular time of day. Accordingly, the models may be specific to persons, merchants, products, services, locations, times, communication channels, or the like.

At step 1207, processor may integrate the neural networks into a deep field network. For example, the models may be combined into a larger predictive scheme. In one particular example, the models may be combined such that when a new tensor is convolved (or otherwise combined with the models), the model trained on the group (or groups) having the most similar coefficients will be amplified while other models (e.g., trained on groups with less similar coefficients) will be minimized.

The models trained by method 1200 may have various uses. For example, as explained above, the processor may apply the models to new wavelets to determine whether the new wavelets are anomalous (and therefore likely fraudulent, accidental, or the like). Additionally or alternatively, the processor may apply the models to identify personalization, effective communication channels, or other techniques for increasing the likelihood of certain transitions (e.g., of triggering particular transactions, reservations, or other events). Additionally or alternatively, the processor may apply the models to deduce moving averages or other statistics from the tree structure.

Figure 13:
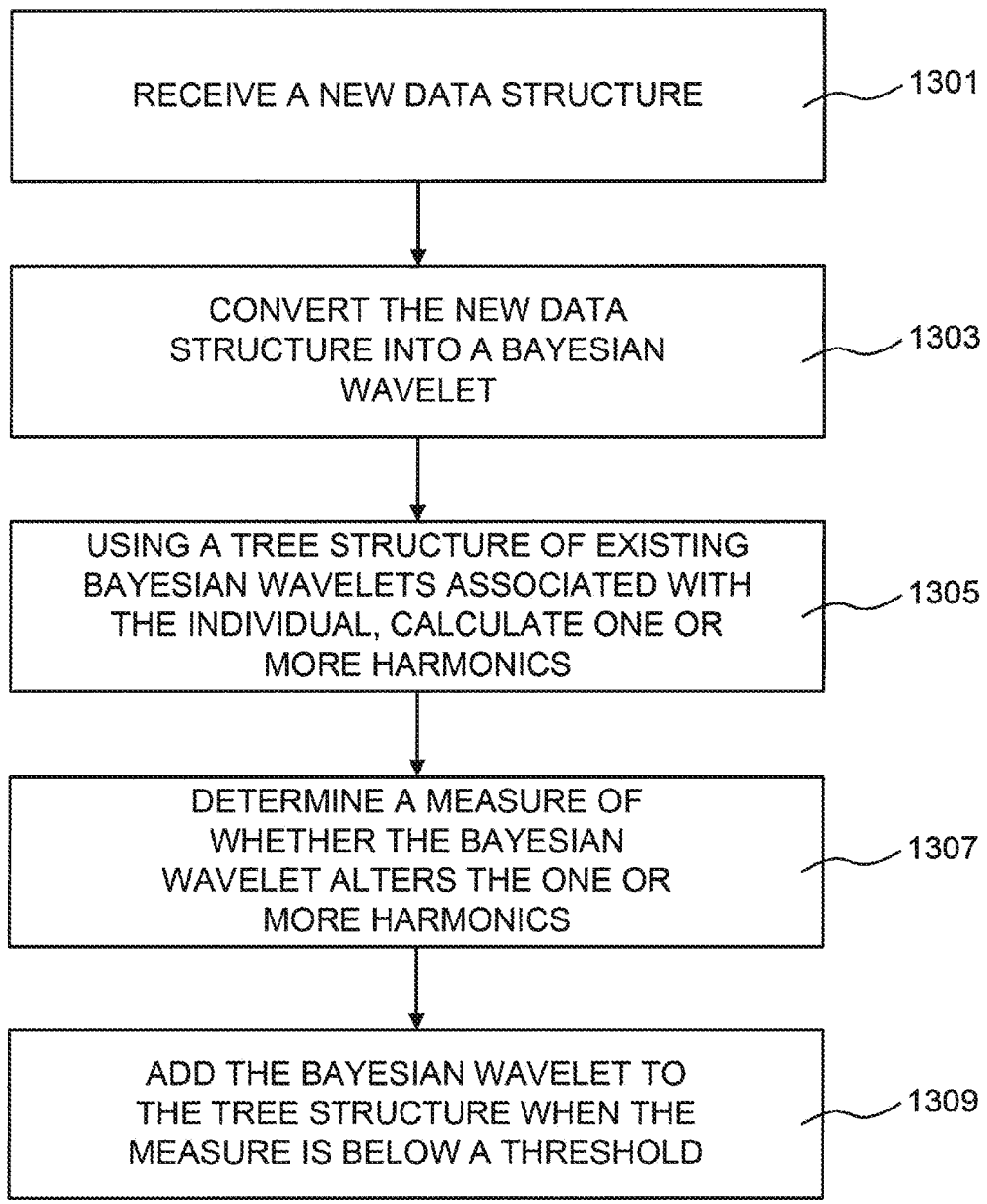
FIG. 13 is a flowchart of an exemplary method for detecting anomalies within a hash tree, according to an exemplary embodiment of the present disclosure.

FIG. 13 is a flowchart of exemplary method 1300 for detecting anomalies within a hash tree. Method 1300 may be implemented using a general-purpose computer including at least one processor, e.g., detection server 1401 of FIG. 14. Alternatively, a special-purpose computer may be built for implementing method 1300 using suitable logic elements.

At step 1301, a processor may receive a new data structure related to an individual. The new data structure need not be received in any particular format but may be represented in any appropriate form such as arrays, digital signals, or the like. The new data structure may be received from one or more memories and/or across one or more computer networks. Alternatively, the processor may receive raw data and convert the data into a particular data structure. For example, the processor may receive data with time, location, and the like and may convert this data into a single bundle (e.g., a data serialization formats, such as JSON, XML, YAML, etc., or any other defined structure of data) representing an event.

At step 1303, the processor may convert the data structure into a Bayesian wavelet. For example, as explained above, the processor may convert the new data structure (along with any associated properties or metadata) into a wavelet or into an array or other format that represents a wavelet. Additionally or alternatively, the processor may convert raw data received at step 1301 to one or more data serialization formats, such as JSON, XML, YAML, etc., that may be operated on as though it were a wavelet.

At step 1305, using a tree structure of existing Bayesian wavelets associated with the individual, the processor may calculate one or more harmonics. For example, as explained with respect to FIG. 5, Markovian wavelets may describe transition probabilities between the Bayesian wavelets from which the harmonics may be calculated.

At step 1307, the processor may determine a measure of whether the Bayesian wavelet alters the one or more harmonics. For example, the processor may determine a scalar representing a magnitude of change of one or more harmonics or a vector representing direction and magnitude of change of one or more harmonics.

In some embodiments, the processor may further convert the Bayesian wavelet to a tensor. For example, as explained above, the processor may convert the wavelet to a tensor based using a moving average, such as a simple moving average, a cumulative moving average, a weighted moving average, an exponential moving average, or the like. Accordingly, the processor may perform a cascading convolution (e.g., with one or more filter banks) followed by an accumulation (e.g., using the moving average for smoothing) to transform the received wavelet into a tensor.

At step 1309, the processor may add the Bayesian wavelet to the tree structure when the measure is below a threshold. Otherwise, the Bayesian wavelet may be considered anomalous. In such embodiments, the processor may send a notification to such effect. For example, the processor may send a rejection signal or a message indicating the likelihood and/or a reason (e.g., based on the one or more models) for rejection. The processor may send the notification to one or more parties associated with the new wavelet (e.g., a financial institution, an individual, a merchant, or the like) and/or to one or more computer systems from which the new wavelet was received (e.g., a personal computer such as a desktop computer or mobile phone, a point-of-service system, a financial processing server, a credit bureau server, or the like).

In some embodiments, based on the likelihood, the processor may request additional information. For example, as explained above, the processor may request a deposit before authorizing a reservation. In another example, the processor may request manual verification before authorizing a transaction.

In embodiments where the Bayesian wavelet is converted to a tensor, the measure of whether the Bayesian wavelet alters the one or more harmonics may be based on a differential field between the tensor and a field representing the tree structure. For example, the processor may have previously calculated the field using wavelets in the tree structure. As explained above, the processor may perform cascading convolution (e.g., with one or more filter banks) followed by an accumulation (e.g., using the moving average for smoothing) to transform the wavelets in the tree structure into tensors and obtain the field by mapping the tensors onto a manifold (e.g., a differential manifold or the like) using one or more atlases.

Alternatively, the processor may receive the tensors representing the wavelets in the tree structure (e.g., from one or more memories and/or over one or more computer networks) and construct the field therefrom. Alternatively, the processor may receive the field directly (e.g., from one or more memories and/or over one or more computer networks).

The disclosed systems and methods may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be an example only, and not meant to limit implementations of the systems and methods described in this specification. Other computing devices suitable for implementing the disclosed systems and methods may have different components, including components with different connections, relationships, and functions.

As explained above, FIG. 14 is a block diagram that illustrates an exemplary detection server 1401 suitable for implementing the disclosed systems and methods. Detection server 1401 may reside on a single server farm or may be distributed across a plurality of server farms.

Figure 14:
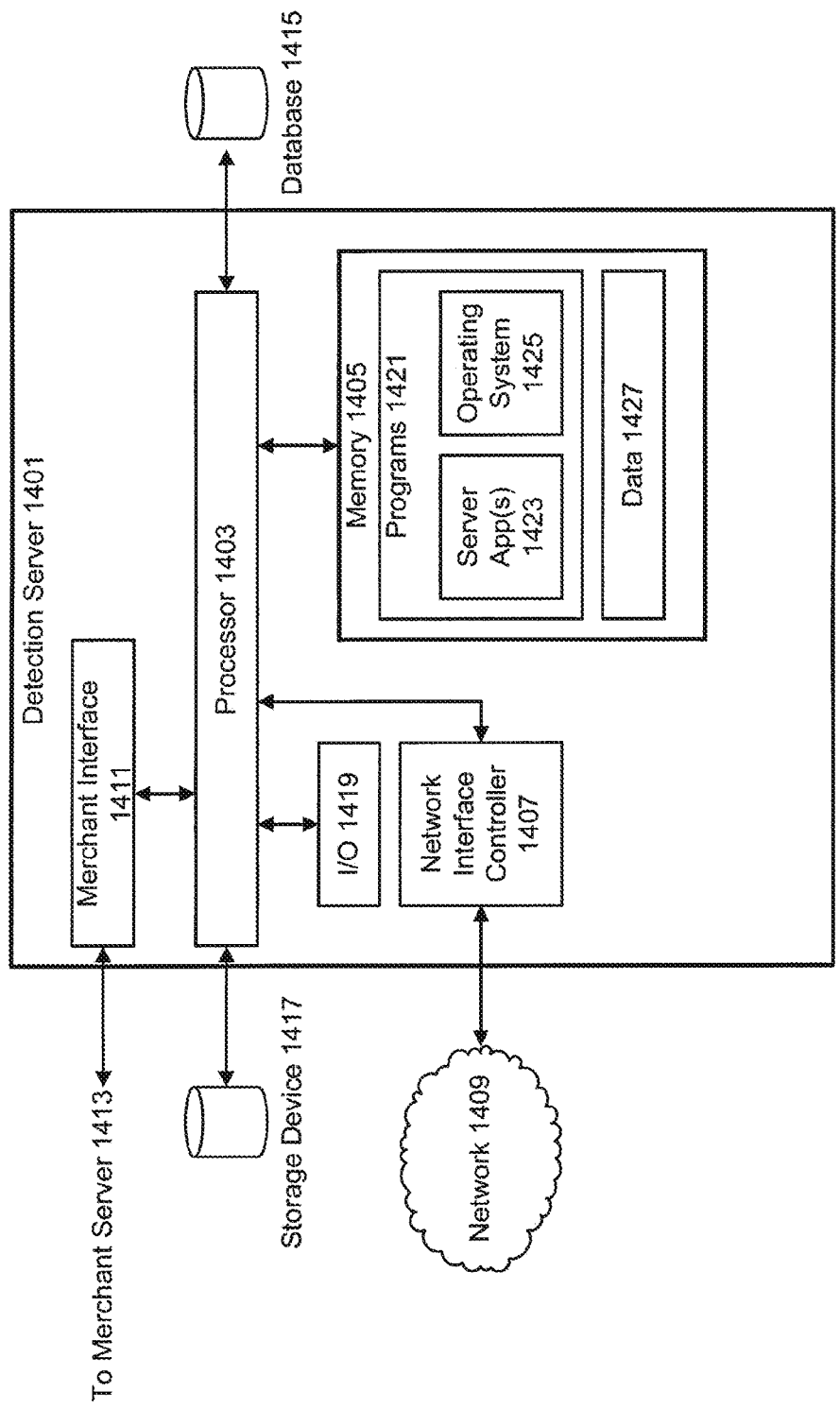
FIG. 14 is a block diagram of an exemplary computing device with which the systems, methods, and apparatuses of the present disclosure may be implemented.

As depicted in FIG. 14, detection server 1401 may include at least one processor (e.g., processor 1403), at least one memory (e.g., memory 1405), and at least one network interface controller (NIC) (e.g., NIC 1407).

Processor 1403 may comprise a central processing unit (CPU), a graphics processing unit (GPU), or other similar circuitry capable of performing one or more operations on a data stream. Processor 1403 may be configured to execute instructions that may, for example, be stored on memory 1405.

Memory 1405 may be volatile memory (such as RAM or the like) or non-volatile memory (such as flash memory, a hard disk drive, or the like). As explained above, memory 1405 may store instructions for execution by processor 903.

NIC 1407 may be configured to facilitate communication with detection server 1401 over at least one computing network (e.g., network 1409). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 1409 over which detection server 1401 is intended to operate. For example, in some embodiments, detection server 1401 may include one or more wireless and/or wired NICs designed to operate over a GSM network, a GPRS network, an EDGE network, a Wi-Fi or WiMax network, and a Bluetooth® network. Alternatively or concurrently, detection server 1401 may include one or more wireless and/or wired NICs designed to operate over a TCP/IP network.

Processor 1403, memory 1405, and/or NIC 1407 may comprise separate components or may be integrated in one or more integrated circuits. The various components in detection server 1401 may be coupled by one or more communication buses or signal lines (not shown).

As further depicted in FIG. 14, detection server 1401 may include a merchant interface 1411 configured to communicate with one or more merchant servers (e.g., merchant server 1413). Although depicted as separate in FIG. 14, merchant interface 1411 may, in whole or in part, be integrated with NIC 1407.

As depicted in FIG. 14, detection server 1401 may include and/or be operably connected to a database 1415 and/or a storage device 1417. Database 1415 may represent a wavelet database or other digital database, which may be stored, in whole or in part, on detection server 1401 and/or, in whole or in part, on a separate server (e.g., one or more remote cloud storage servers). Storage device 1417 may be volatile (such as RAM or the like) or non-volatile (such as flash memory, a hard disk drive, or the like).

I/O module 1419 may enable communications between processor 1403 and memory 1405, database 1415, and/or storage device 1417.

As depicted in FIG. 14, memory 1405 may store one or more programs 1421. For example, programs 1421 may include one or more server applications 1423, such as applications that facilitate graphic user interface processing, facilitate communications sessions using NIC 1407, facilitate exchanges with merchant server 1413, or the like. By way of further example, programs 1421 may include an operating system 1425, such as DRAWIN, RTXC, LINUX, iOS, UNIX, OS X, WINDOWS, or an embedded operating system such as VXWorkS. Operating system 1425 may include instructions for handling basic system services and for performing hardware dependent tasks. In some implementations, operating system 1425 may comprise a kernel (e.g., UNIX kernel). Memory 1405 may further store data 1427, which may be computed results from one or more programs 1421, data received from NIC 1407, data retrieved from database 1415 and/or storage device 1417, and/or the like.

Each of the above identified instructions and applications may correspond to a set of instructions for performing one or more functions described above. These instructions need not be implemented as separate software programs, procedures, or modules. Memory 1405 may include additional instructions or fewer instructions. Furthermore, various functions of detection server 1401 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for training a deep field network to detect anomalies within a hash tree, the system comprising:
    one or more memories storing instructions; and
    one or more processors configured to execute the instructions to:
        receive a plurality of tree structures representing individuals, each tree structure including Bayesian wavelets and Markovian wavelets governing transitions between the Bayesian wavelets and being configured as a persona representing a corresponding individual,
        replace one or more of the Bayesian wavelets with hashes of the one or more Bayesian wavelets;
        group the Bayesian wavelets in the tree structures by coefficients,
        convert the Bayesian wavelets to tensors;
        train, using the tensors converted from the Bayesian wavelets, a neural network for each group independently of other groups while increasing a likelihood of a corresponding wavelet being anomalistic within each group,
        integrate the neural networks into a deep field network, wherein combining a new wavelet with the neural networks amplifies a first neural network corresponding to a first group having a first set of coefficients and minimizes a second neural network corresponding to a second group having a second set of coefficients,
        calculate a difference field between a corresponding tensor representing the new wavelet and a corresponding field representing the tensors from the tree structure to form a difference vector, and
        detect one or more anomalies within the tree structures using the integrated neural networks by determining whether a corresponding tensor is anomalous based on one or more thresholds applied to the difference vector, wherein the one or more anomalies indicate an alteration in harmonics of the tree structures.

2. The system of claim 1, wherein each neural network is further trained specific to at least one of a particular tree structure, a particular location, or a particular time of day.

3. The system of claim 1, wherein converting the wavelets to tensors includes applying a discrete wavelet transform.

4. The system of claim 3, wherein the discrete wavelet transform is performed using a filter bank having a plurality of convolutional-accumulators.

5. The system of claim 4, wherein the convolutional accumulators are configured to accumulate using base e.

6. The system of claim 4, wherein the discrete wavelet transform includes an exponential smoothing average in the filter bank.

7. The system of claim 4, wherein the one or more processors further execute the instructions to convert the Bayesian wavelets to tensors that are output with the tree structures.

* * * * *